United States Patent
DiClaudio

(10) Patent No.: US 7,615,700 B2
(45) Date of Patent: Nov. 10, 2009

(54) TRAINING DEVICE FOR BRASS MUSICAL INSTRUMENT

(76) Inventor: Mark DiClaudio, 10535 Timberstone Rd., Johns Creek, GA (US) 30022

( * ) Notice: Subject to any disclaimer, the term of this patent is extended or adjusted under 35 U.S.C. 154(b) by 0 days.

(21) Appl. No.: 12/287,306

(22) Filed: Oct. 8, 2008

(65) Prior Publication Data

US 2009/0100983 A1 Apr. 23, 2009

Related U.S. Application Data

(60) Provisional application No. 60/980,892, filed on Oct. 18, 2007.

(51) Int. Cl.
*G10D 9/02* (2006.01)
(52) U.S. Cl. .......................... 84/398; 84/465
(58) Field of Classification Search .................. 84/465, 84/398
See application file for complete search history.

(56) References Cited

U.S. PATENT DOCUMENTS

| | | | | |
|---|---|---|---|---|
| 8,449 A * | 10/1851 | Meech | ........................ | 84/398 |
| 1,763,336 A * | 6/1930 | Wilder | ..................... | 84/387 R |
| 1,852,749 A * | 4/1932 | Hiner | ......................... | 84/399 |
| 2,164,458 A * | 7/1939 | Jacobson | .................... | 84/465 |
| 2,515,411 A * | 7/1950 | La Velle | ..................... | 84/398 |
| 3,293,976 A * | 12/1966 | Windows, Jr. | ................ | 84/453 |
| 3,659,489 A * | 5/1972 | Vale | ............................ | 84/465 |
| 3,721,151 A * | 3/1973 | Dimond | ....................... | 84/398 |
| 3,853,034 A * | 12/1974 | Vale | ............................. | 84/465 |
| 4,012,983 A * | 3/1977 | Ploeger | ....................... | 84/400 |
| 4,120,228 A * | 10/1978 | Windows, Jr. | ................ | 84/453 |
| 4,245,544 A | 1/1981 | Holland | | |
| 4,378,724 A * | 4/1983 | Lamart | ........................ | 84/465 |
| 4,658,697 A * | 4/1987 | Wean | .......................... | 84/465 |
| D358,161 S * | 5/1995 | Kubala | ........................ | D17/13 |
| 5,847,300 A * | 12/1998 | Hackl | .......................... | 84/398 |
| 6,031,168 A * | 2/2000 | Damm | ...................... | 84/380 B |
| 6,080,924 A * | 6/2000 | Cowen et al. | ................. | 84/453 |
| 6,768,045 B1 * | 7/2004 | Ellis | ............................ | 84/465 |
| 7,560,631 B1 * | 7/2009 | John et al. | ..................... | 84/398 |
| 2006/0090630 A1 * | 5/2006 | Woods | ......................... | 84/465 |
| 2008/0295669 A1 * | 12/2008 | Hashimoto | ................. | 84/387 R |
| 2009/0100983 A1 * | 4/2009 | DiClaudio | .................... | 84/398 |
| 2009/0188375 A1 * | 7/2009 | Jancic | ......................... | 84/465 |

OTHER PUBLICATIONS

The Ultimate B.E.R.P.; http://www.berp.com; 1985.
The Brass Buzzer; http://www.brassbuzzer.com; 2001.

* cited by examiner

*Primary Examiner*—Jeffrey Donels
*Assistant Examiner*—Robert W Horn
(74) *Attorney, Agent, or Firm*—Stuart J. Friedman

(57) ABSTRACT

A training device for use by a player with a brass instrument having a tubular mouthpiece receiver with an opening in one end and a mouthpiece having an elongated shank at one end for insertion through the opening into the receiver. The device has a substantially planar shield having an upper side and an underside and an aperture formed therethrough and at least two elongate, flexible and resilient prongs extending generally perpendicularly from the periphery of the aperture along the underside of the shield. The training device is inserted prongs first into the receiver until a gap is defined between the underside of the shield and the one end of the receiver. The mouthpiece shank is then inserted through the aperture for concentric positioning within the receiver with the prongs spacing the shank from the inner walls of the receiver.

26 Claims, 4 Drawing Sheets

TRAINING DEVICE FOR BRASS MUSICAL INSTRUMENT

CROSS-REFERENCE TO RELATED APPLICATIONS

This is a non-provisional application based upon U.S. provisional application Ser. No. 60/980,892, filed Oct. 18, 2007, now pending.

FIELD OF THE INVENTION

The present invention relates to a training device for a brass musical instrument and, more particularly, to a training device for insertion into a brass musical instrument between the mouthpiece and the mouthpiece receiver for pronouncing the sensation known as "buzz."

BACKGROUND OF THE INVENTION

The training device of the present invention is particularly useful with the family of musical instruments known as the brass family. Such instruments include, but are not limited to, the trumpet, trombone, tuba, euphonium, cornet, flugelhorn and French horn. All such instruments have in common a mouthpiece of roughly the same shape with varying dimensions to match the size of the instrument's tubular receiver opening. The mouthpiece has at one end a large, circular end portion where the player's lips meet the mouthpiece and at the other end an elongate tubular shank having a diameter suitable to be received within the mouthpiece receiver of the body of the particular instrument.

Sound production on brass musical instruments begins with the vibrations generated by passing air between closely positioned lips. The vibration production is commonly known as the "buzz." The part of the brass instrument that focuses the lip vibrations or buzz is the mouthpiece. The buzz is created by blowing air through the lips while the lips are controlled by the player using isometric tension, beginning at the corners of the mouth, and flexing the embouchure muscles at varying tensions, depending on what pitch frequency is desired. Control over the pitches which are produced requires extensive practice toward the goal of achieving full sensory understanding of the control necessary to produce desired pitches. Historically, it has required extensive repetition to achieve the level of sensory understanding and control necessary to fully develop a traditionally proper brass instrument embouchure and sound production, at least in part because adequate training devices have not been available.

Mouthpiece buzzing, i.e., playing on just the mouthpiece of a brass instrument separate from the instrument itself, by holding the mouthpiece between the index finger and thumb of one hand and placing it directly up against the lips, has historically been the accepted method of practicing buzzing. The player would then reassemble the instrument in its traditional and complete form and attempt to recreate the buzz sensation and control with the mouthpiece inside the instrument's receiver. Unfortunately, once the instrument is completely assembled, the sensation is changed by the vibration transfer caused by direct and complete contact with the inside of the receiver, and only through extensive repetition and practice could a player begin to understand and control the transference of the buzz sensation from the mouthpiece alone to the fully assembled instrument. Moreover, it has been recognized that buzzing the mouthpiece separate from the instrument provides no guidance for pitch control. Efforts have been made to simulate the feel and buzz of an instrument attached to the mouthpiece without actually inserting the mouthpiece into an instrument, such as in U.S. Pat. No. 6,768,045, by utilizing a sound reflector and a mouthpiece mount to position the mouthpiece near the reflector. In U.S. Pat. No. 4,245,544 a mouthpiece holder in the form of a housing approximating that portion of an instrument normally grasped by the left hand includes means to mount a mouthpiece to simulate the mouthpiece mounted in a brass instrument. In U.S. Pat. No. 3,853,034 a brass musical instrument practice device is disclosed which comprises a length of tubing having a mouthpiece attached at one end and a tubular valve attached at the other end to simulate the mouthpiece mounted in a brass instrument. Other known devices, such as the B.E.R.P. (Buzz Extension and Resistance Piece), mount the mouthpiece on, but not in, a brass instrument using a screw tightened clamp surrounding the receiver tube. A similar device, known as the "Brass Buzzer" also mounts the mouthpiece on, but not in, a brass instrument by surrounding the mouthpiece with a ring which is attached to a lead pipe shank that seats within the instrument's receiver.

No known training device, however, actually mounts the mouthpiece inside the receiver of the instrument. As a result, all of the prior art devices lack at least one critical element of buzz development—namely, attachment of the buzz sensation to the exact and corresponding pitch frequencies unique to each individual instrument.

Accordingly, there is a need for a training device for a brass musical instrument which promotes buzz control over pitch accuracy and attack by providing means for inserting the mouthpiece within the receiver and, effectively, permitting the instrument to be the vehicle for marrying buzz control and accurate pitch reference.

SUMMARY OF THE INVENTION

It is, therefore, a primary object of the present invention to provide a new and improved training device for brass instrument players.

It is another object of the present invention to provide a new and improved training device for brass instrument players that is small, light, durable, easy to carry, inexpensive and easy to manufacture.

It is still another object of the present invention to provide a new and improved training device for brass instrument players which mounts the mouthpiece inside the receiver of the instrument.

It is yet another object of the present invention to provide a new and improved training device for brass instrument players which promotes attachment of the buzz sensation to the exact and corresponding pitch frequencies unique to each individual instrument.

It is still another object of the present invention to provide a new and improved training device for brass instrument players which promotes pitch accuracy and buzz control while utilizing the pitch defining characteristics of the instrument.

It is another object of the present invention to provide a new and improved training device for brass instrument players which enhances all aspects of buzz control and sound production including, but not limited to, tone, color, resonance, ease of response, clarity of production, volume variation and accuracy of attack while encouraging development of embouchure muscle control and endurance.

The foregoing and other objects are achieved in accordance with the present invention by providing a training device for use by a player with a brass instrument having an instrument body, a tubular mouthpiece receiver having an opening in one end thereof and a mouthpiece adapted to be received within said receiver, said mouthpiece having one end where a player's lips meet the mouthpiece and an elongated shank at the opposite end for insertion through said opening into said receiver, said training device, comprising:

a substantially planar shield having an upper side and an underside and an aperture formed in said shield extending between said upper side and said underside;

at least two elongate, flexible and resilient prongs extending generally perpendicularly from the periphery of said aperture along the underside of said shield, said prongs having a length not exceeding the length of said mouthpiece shank;

said training device being adapted to be inserted prongs first into said receiver, whereby when said training device is fully inserted a gap is defined between the underside of said shield and said one end of said receiver and said mouthpiece shank is inserted through said aperture for concentric positioning within said receiver with said prongs spacing said shank from the inner walls of said receiver.

In another aspect of the present invention, there is provided A training device for use by a player with a brass instrument having an instrument body, a tubular mouthpiece receiver having an opening in one end thereof and a mouthpiece adapted to be received within said receiver, said mouthpiece having one end where a player's lips meet the mouthpiece and an elongated shank at the opposite end for insertion through said opening into said receiver, said training device, comprising:

a substantially planar shield having an upper side and an underside and an aperture formed in said shield extending between said upper side and said underside;

at least two elongate, flexible and resilient prongs extending generally perpendicularly from the underside of said shield at equal radial distances beyond the periphery of said aperture such that said prongs are spaced apart sufficiently that the distance between said prongs is slightly greater than the outer diameter of said receiver, said prongs having a length not exceeding the length of said mouthpiece shank, the ends of said prongs remote from said shield being interconnected by a circumferential band surrounding at least a portion of said receiver, said band including means for tightening said band about the periphery of said receiver;

said device being adapted to have its shield positioned opposite said one end of said receiver and its prongs extending along the outer periphery of said receiver, whereby the position of said training device relative to said receiver can be adjusted and said device releasably fixed in position for defining a gap between the underside of said shield and said one end of said receiver, with said mouthpiece shank inserted through said aperture for concentric positioning within said receiver.

DESCRIPTION OF THE PREFERRED EMBODIMENT

Figure 1:
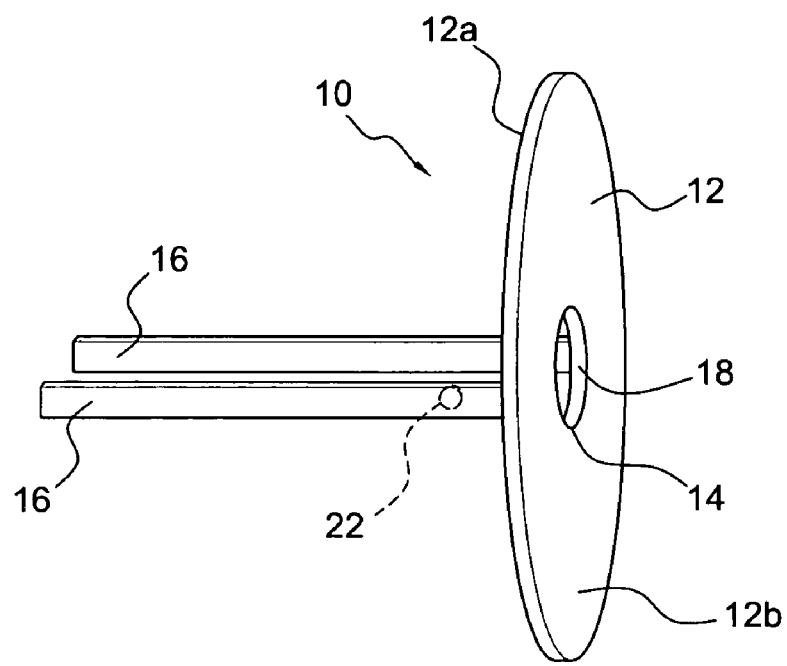
FIG. 1 is a perspective view of the training device of the present invention viewed from the side.
Figure 2:
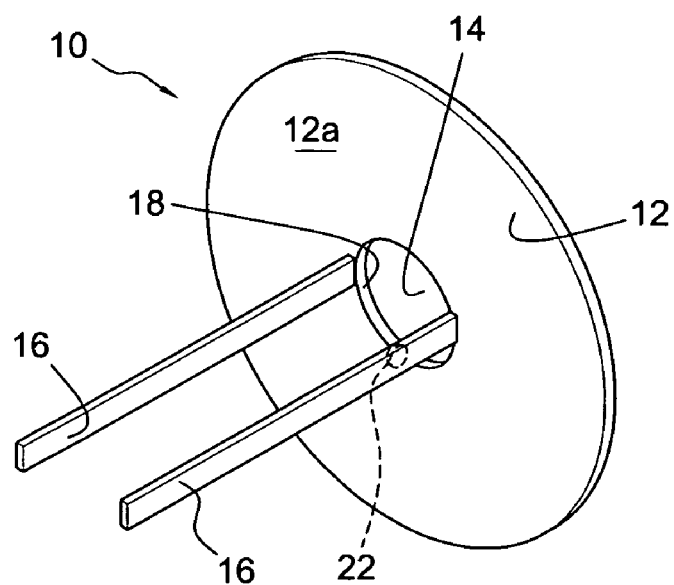
FIG. 2 is a perspective view of the training device of the present invention viewed from the rear.
Figure 3:
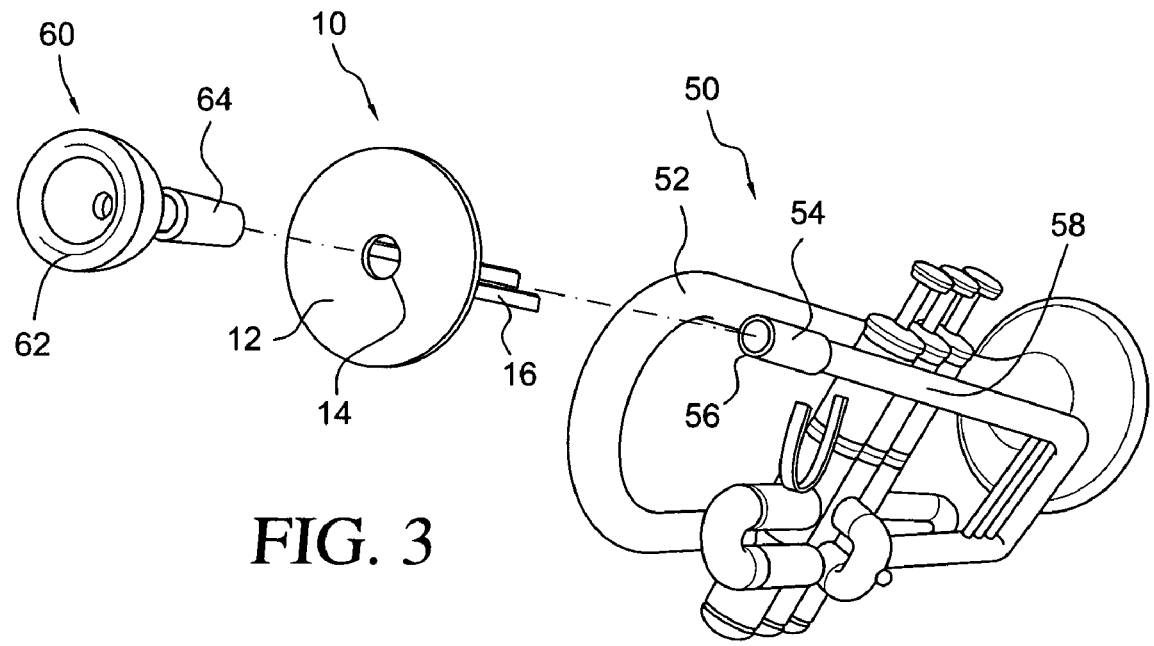
FIG. 3 is an exploded perspective view of the training device of the present invention positioned for insertion within a brass instrument.
Figure 4:
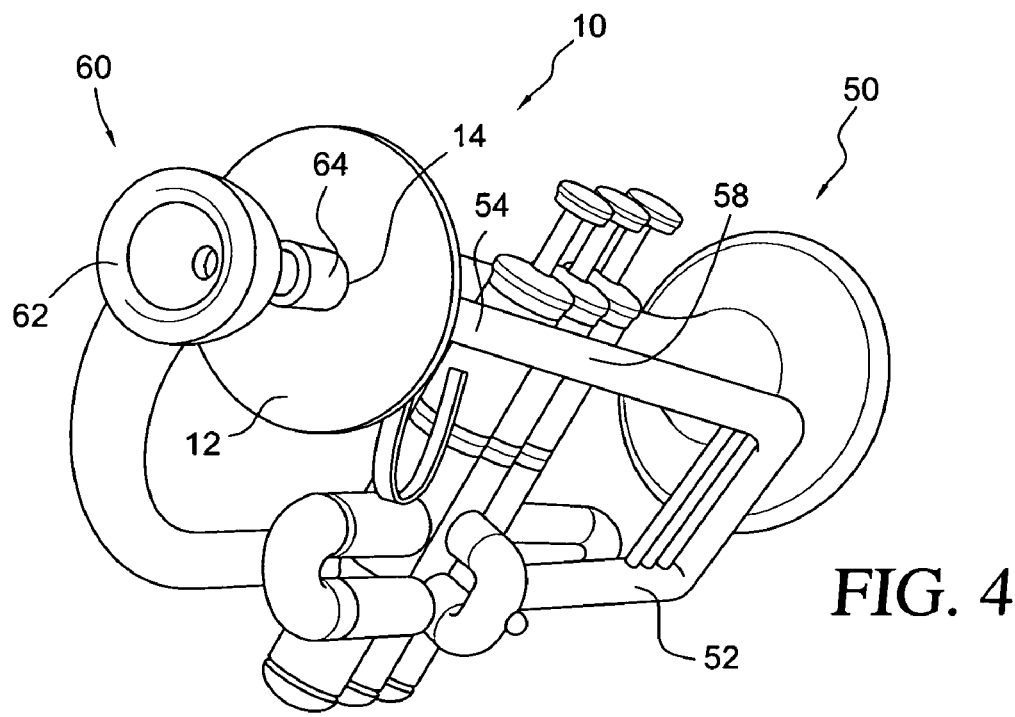
FIG. 4 is a perspective view of the training device of the present invention inserted within a brass instrument as viewed from the player's end of the instrument.
Figure 5:
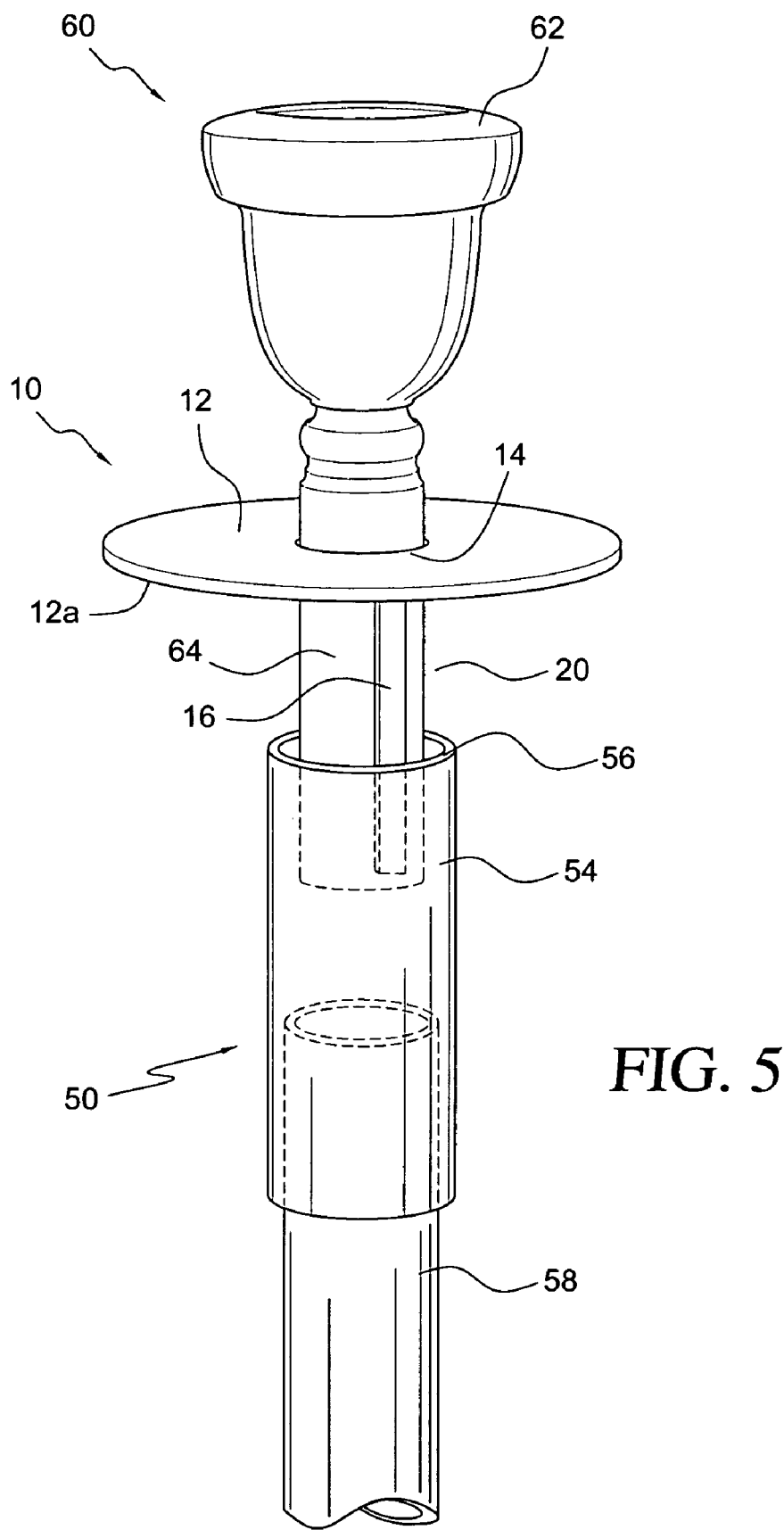
FIG. 5 is a perspective view of the mouthpiece and receiver end of a brass instrument showing the training device of the present invention and the mouthpiece in position within the instrument, as viewed from the side.

Training device 10, in the embodiment shown in FIGS. 1-5, is formed of a base or shield 12 having an aperture 14 therein and at least two prongs 16 extending perpendicularly from the underside 12a of shield 12 along the periphery 18 of aperture 14. Desirably, prongs 16 are circumferentially equally spaced apart about the periphery 18 of aperture 14. With reference to FIGS. 3-5, training device 10 is adapted to be used with a traditional brass instrument 50 having an instrument body 52, a mouthpiece receiver 54 having an opening 56 in one end thereof, a lead pipe 58 extending concentrically within the opposite end of receiver 54 and a mouthpiece 60 partially housed within receiver 54. Mouthpiece 60 has an enlarged diameter end 62 where the player's lips meet the mouthpiece and an elongated shank 64 at the opposite end for insertion through opening 56 into receiver 54 such that, when fully seated within receiver 54, shank 64 terminates short of lead pipe 58.

The training device 10 of the present invention is used by inserting it prongs 16 first through opening 56 into the mouthpiece receiver 54 of instrument 50. When inserted, due to the relative dimensions of device 10 and receiver 54, or through other means to be discussed hereinafter, there is a small gap 20 (see FIG. 5) between the underside 12a of shield 12 and the end of receiver 54. Next, the free end of shank 64 of mouthpiece 60 is inserted through aperture 14 into receiver 54, without twisting (as might be done to lock the mouthpiece 60 within receiver 54). When inserted correctly, mouthpiece 60 will not fully seat within receiver 54 but will extend from receiver opening 56 about one half inch more than when it is inserted without the training device 10 of the present invention. Insertion of the mouthpiece 60 causes the prongs 16 to be trapped between the outer diameter of shank 64 and the inner diameter of receiver 54, thus preventing, either totally or to a large extent, surface to surface contact between the shank 64 and the receiver 54. The engagement of the prongs 16 with the surfaces of the shank 64 and the receiver 54 causes the receiver to lightly grip the mouthpiece sufficient to hold it in place for purposes of training. The training device 10 holds the mouthpiece 60 in the most effective position for developing proper buzz and air efficiency into and through instrument 50 and allows the player to create a clear, vibrant buzz which accesses the full spectrum of colors and resonance from instrument 50.

Shield 12 effectively serves as a spit shield for protecting the player from the air and spit emitted through gap 20 while buzzing. Accordingly, it may have any dimensions and shape suitable for this purpose. Desirably, shield 12 is substantially planar which, as used herein, means it is either planar (i.e., flat), almost planar or planar in the area surrounding aperture 14 to allow easy positioning of device 10 within receiver 54 and to allow easy manufacturing by affixing prongs 16 to a planar portion of shield underside 12a. In one embodiment of the invention shield 12 is generally disk shaped having a diameter sufficient to serve as a spit shield but not so large as to impede the player's breathing or view of the music sheets. A useful shield has a disk shape and a diameter of 1"-2", desirably about 1.5". If desired, the upper side 12b of shield 12 can be convex at its periphery, as viewed by the player, to more effectively serve as a spit shield. It will be appreciated, however, that shield 12 can have any shape, regular or irregular, and any dimensions, which permits it to serve as a spit shield without impeding the player's breathing or view of the music sheets.

Aperture 14 is desirably positioned at the center of shield 12, although it may be otherwise located depending upon the shape and dimensions of shield 12. The diameter of aperture 14 is desirably not less than the diameter of receiver opening 56, although preferably it is slightly larger than receiver opening 56. This is because, in many instances, shank 64 of mouthpiece 60 has a slightly increasing diameter toward its free end, and since mouthpiece 60 does not fully seat within receiver 54, aperture 14 often engages a slightly larger diameter part of shank 64 than receiver opening 56 would engage were the training device 10 not present.

Prongs 16, which extend generally perpendicularly from the underside 12a of shield 12 from along the periphery of aperture 14, do not exceed the length of shank 64 of mouthpiece 60 and are dimensioned and formed of a material which causes them to be flexible, moderately compressible, yet resilient, when mouthpiece 60 is inserted through aperture 14 into receiver 54. Prongs 16 act as spacers between shank 64 of mouthpiece 60 and the inner wall of receiver 54 to prevent or minimize metal-to-metal contact between the shank 64 and receiver 54. It will be appreciated that the dimensions of each prong 16 are dependent upon a number of factors such as the material from which the prongs are formed, the number of prongs used, the need to provide sufficient engagement between the mouthpiece 60 and the receiver 54 to allow pitch diffusion control and the need to allow the mouthpiece 60 entry into the receiver 54 to a depth sufficient for the receiver 54 to maintain position control of the mouthpiece 60 and retain it within the instrument 50. However, for purposes of illustration only, it has been found that a training device useful in many brass instruments is formed with two prongs, each about 0.75" to 1" in length, a thickness (as measured along a line between the two prongs) of about 0.01" to 0.02", desirably about 0.015", and a height of about 0.2" to 0.3", desirably about 0.25". Typically, for most brass instruments, two prongs are sufficient. However, when used with the larger brass instruments, e.g., tuba, trombone, or in instances where it is desired to increase the extent of engagement between the training device, on the one hand, and the shank and receiver, on the other hand, more than two prongs 16 may be desirable. In lieu of using more than two prongs 16, a similar effect may be achieved by using multiple devices 10 stacked one atop the other, with the first device 10 inserted through receiver opening 56, as hereinbefore described, and subsequent devices 10 having their prongs 16 inserted through the aperture(s) 14 of the previously installed device(s) 10. Materials which have been found to be particularly useful because they are easily molded and relatively inexpensive, as well as sufficiently flexible and compressible, yet resilient enough to return prongs 16 to their original shape after device 10 is removed from an instrument 50, are polypropylene and nylon. It will be appreciated, however, that the identification of these exemplary materials is not intended to exclude numerous other moldable plastic materials, fibrous resins, some metals, and other materials which are suitable as well. Where the materials permit, it is preferred that shield 12 and prongs 16 are unitary, for example, where device 10 is formed of molded plastic.

It is important that when inserted within receiver opening 56, training device 10 does not fully seat and that there remains a small gap 20 between the underside 12a of shield 12 and the end of receiver 54. This gap 20 allows the escape of spit and air during buzzing. In the preferred embodiment, where aperture 14 is slightly larger than receiver opening 56, the distance between prongs 16, which essentially equals the diameter of aperture 14, is also slightly larger than receiver opening 56. Thus, when device 10 is inserted prongs 16 first into opening 56, it is necessary to press the prongs 16 toward each other at their free ends for them to fit through opening 56. As the device is gently pressed downwardly into receiver 54, the flexibility and resiliency in the free ends of prongs 16 will allow the prongs to be urged toward each other by the inner wall of receiver 54 until, as the underside of shield 12a approaches the end of receiver 54, the attachment spacing of the prongs 16 to the shield 12 will not allow them to move further toward each other and the device 10 will not fully seat within receiver 54, leaving gap 20. Gap 20, in a preferred embodiment, is about 1/16" to 3/16" long, desirably about 1/8" long. In instances where the diameter of aperture 14 is about equal to the diameter of the receiver opening 56, or where it is desirable to fix the gap 20 at a predetermined length, then stops are used along prongs 16 to limit the amount device 10 can be inserted into receiver 54. One simple and useful form of stop, particularly where the device 10 is molded of plastic, is to mold a protrusion 22, in the nature of a bump or pimple, on the radially outer surface, relative to aperture 14, of each of prongs 16 at a predetermined distance spaced from the underside 12a of shield 12. In this way, as device 10 is inserted within receiver 54, it can only be pressed into receiver 54 until protrusions 22 engage receiver opening 56, thus fixing the position of device 10 within receiver 54 and determining the length of gap 20. It will be appreciated that stops may be otherwise attached onto prongs 16 and other forms of stops may be used. It should be remembered that when using stops to determine the length of the gap 20, the further out of receiver 54 that the mouthpiece 60 is secured, the less obvious are the pitch defining characteristics of the instrument 50 and the more refined control of pitch is required by the player.

Figure 6:
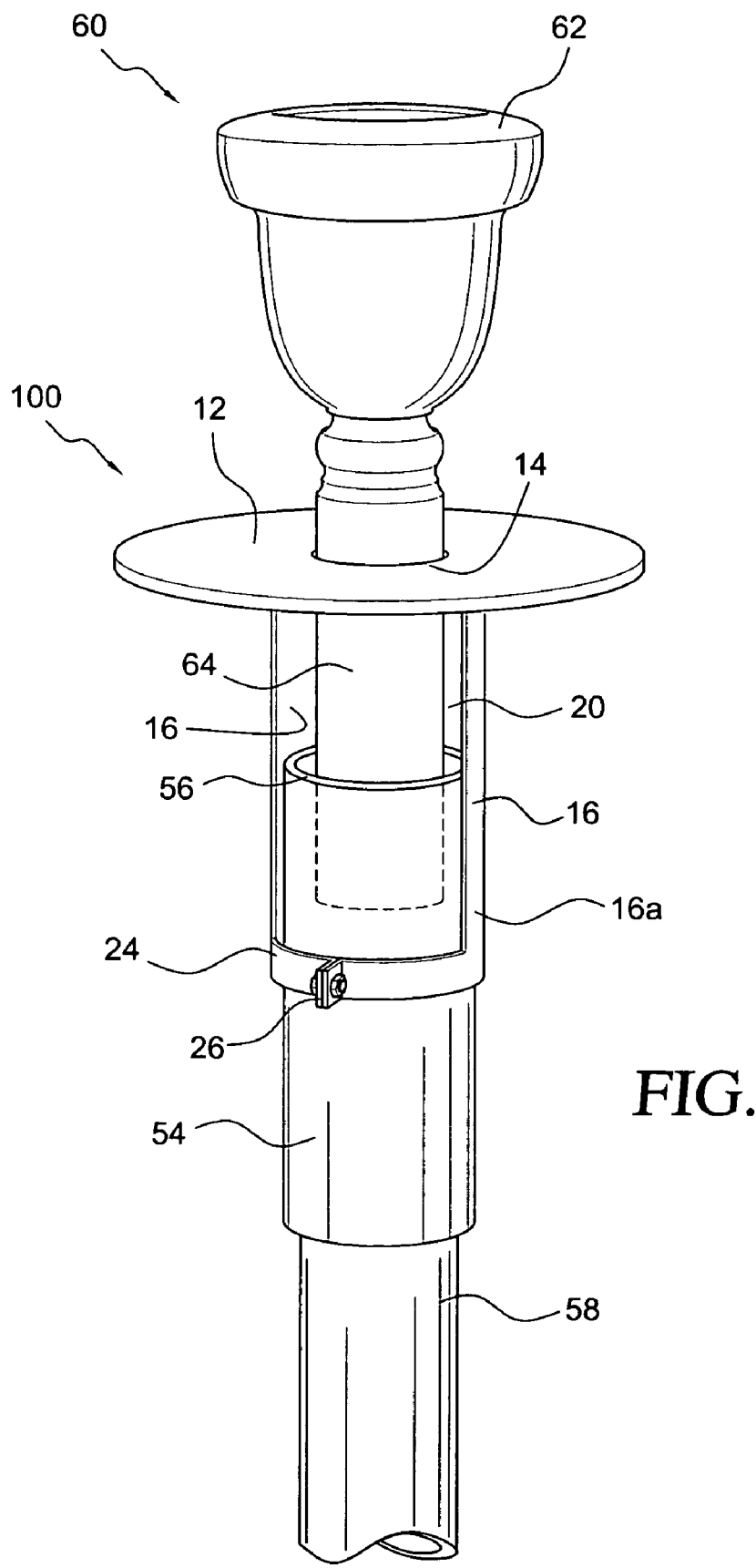
FIG. 6 is a perspective view of the mouthpiece and receiver end of a brass instrument showing a second embodiment of the training device of the present invention and the mouthpiece in position within the instrument, as viewed from the side.

In another embodiment of the invention, as shown in FIG. 6, prongs 16 of training device 100 do not extend from the periphery of aperture 14 into receiver 54 but, rather, extend from the underside 12a of shield 12 at equal radial distances beyond the periphery 18 of aperture 14 such that prongs 16 are spaced apart sufficiently that the diametric distance between prongs 16 is slightly greater than the outer diameter of receiver 54. The ends 16a of prongs 16 remote from shield 12 are interconnected by a circumferential band 24 surrounding at least a portion of receiver 54, which includes an opening in the band 24 and parallel shields thereon defining a clasp 26 which can be screw tightened around the periphery of receiver 54. In this manner, device 100 is held in place by frictional engagement between the circumferential band 24 and the periphery of receiver 54. It will be appreciated that with device 100, the depth to which the shank 64 penetrates receiver 54 and the length of gap 20 can be readily adjusted. It will also be appreciated that shank 64 is positioned concentrically within receiver 54 and there is no contact between shank 64 and the inner wall of receiver 54, thus diminishing the influence of the pitch defining characteristics of instrument 50 on the buzz.

The present invention, through the use of training device 10, allows and promotes the auditory and muscle memory of the buzz sensation, through repetition, when the device 10 is removed and the instrument 50 is assembled in its typical and traditional form. With the device 10 affixed to the instrument 50 between mouthpiece 60 and receiver 54, a reduced transference of vibration from the mouthpiece 60 to the body of instrument 50 is the result. Two or more prongs 16 serve as contact points where the shank 64 of mouthpiece 60 meets the receiver 54. This minimal surface contact from mouthpiece 60 to receiver 54 allows the mouthpiece vibration created by the buzz to vibrate freely, thereby reinforcing the desired sensation of the buzz. Transference of the sensation changes when the instrument 50 is assembled completely. The true effectiveness of device 10 is achieved when a player is able to develop a similar approach to buzz production when the instrument is assembled without device 10.

With device 10 installed, when the buzz sound is focused through the instrument 50 via the receiver 54, the buzz sensation is retained. However, the sound is organized into pitches by the instrument 50. Therefore, the buzz sensation may be retained even though the instrument receives the sound but not the vibration from the produced buzz. The advantage of using device 10 is the enhanced control over the buzz while the player receives feedback from the instrument regarding the pitches buzzed into the mouthpiece. Prior to the instant development, in order to receive pitch organization and feedback, the instrument must have been assembled in its traditional form. However, buzzing into an assembled instrument reduces the freedom of vibration and fails to promote further control of the buzz. Thus, use of training device 10 will enhance all aspects of buzz control and the production of sound including, but not limited to, tone color, resonance, ease of response, clarity of production, volume variation and increased accuracy of attack. It will also increase resonance efficiency and promote proper embouchure development. It also may encourage greater understanding of nearly intangible minute muscle controls and manipulations resulting in, but not limited to, the desired variety of tone colors, pitch range, clear articulation control, muscle endurance and ease of airflow through the lips.

While the present invention has been described in terms of specific embodiments thereof, it will be understood that no limitations are intended to the details of construction or design other than as defined in the appended claims.

The invention claimed is:

1. A training device for use by a player with a brass instrument having an instrument body, a tubular mouthpiece receiver having an opening in one end thereof and a mouthpiece adapted to be received within said receiver, said mouthpiece having one end where a player's lips meet the mouthpiece and an elongated shank at the opposite end for insertion through said opening into said receiver, said training device, comprising:

a substantially planar shield having an upper side and an underside and an aperture formed in said shield extending between said upper side and said underside;

at least two elongate, flexible and resilient prongs extending generally perpendicularly from the periphery of said aperture along the underside of said shield, said prongs having a length not exceeding the length of said mouthpiece shank;

said training device being adapted to be inserted prongs first into said receiver, whereby when said training device is fully inserted a gap is defined between the underside of said shield and said one end of said receiver and said mouthpiece shank is inserted through said aperture for concentric positioning within said receiver with said prongs spacing said shank from the inner walls of said receiver.

2. A training device, as claimed in claim 1, wherein said aperture has a diameter which is not less than the diameter of said receiver opening.

3. A training device, as claimed in claim 1, wherein said prongs are circumferentially equally spaced apart about the periphery of said aperture.

4. A training device, as claimed in claim 1, wherein said shield and prongs are unitary and formed of molded plastic.

5. A training device, as claimed in claim 1, wherein said shield is generally disk shaped.

6. A training device, as claimed in claim 1, wherein said aperture is formed in the center of said shield.

7. A training device, as claimed in claim 1, wherein the peripheral edge of said shield upper side is convex.

8. A training device, as claimed in claim 1, wherein two prongs extend from said shield.

9. A training device, as claimed in claim 1, wherein said gap defines a space of about 1/16" to 3/16".

10. A training device, as claimed in claim 1, further including means on said prongs for limiting the insertion of said device into said receiver.

11. A training device, as claimed in claim 10, wherein said means comprises a protrusion on the radially outer surface, relative to said aperture, of said prongs at a predetermined distance spaced from the underside of said shield.

12. A training device, as claimed in claim 1, wherein said shield is generally disk shaped, said aperture has a larger diameter than said receiver opening and is formed in the center of said disk and two prongs are circumferentially equally spaced about the periphery of said aperture.

13. A training device for use by a player with a brass instrument having an instrument body, a tubular mouthpiece receiver having an opening in one end thereof and a mouthpiece adapted to be received within said receiver, said mouthpiece having one end where a player's lips meet the mouthpiece and an elongated shank at the opposite end for insertion through said opening into said receiver, said training device, comprising:

a substantially planar shield having an upper side and an underside and an aperture formed in said shield extending between said upper side and said underside;

at least two elongate, flexible and resilient prongs extending generally perpendicularly from the underside of said shield at equal radial distances beyond the periphery of said aperture such that said prongs are spaced apart sufficiently that the distance between said prongs is slightly greater than the outer diameter of said receiver, said prongs having a length not exceeding the length of said mouthpiece shank, the ends of said prongs remote from said shield being interconnected by a circumferential band surrounding at least a portion of said receiver, said band including means for tightening said band about the periphery of said receiver;

said device being adapted to have its shield positioned opposite said one end of said receiver and its prongs extending along the outer periphery of said receiver, whereby the position of said training device relative to said receiver can be adjusted and said device releasably fixed in position for defining a gap between the underside of said shield and said one end of said receiver, with said mouthpiece shank inserted through said aperture for concentric positioning within said receiver.

14. In combination with a brass musical instrument having an instrument body, a tubular mouthpiece receiver having an opening in one end thereof and a mouthpiece adapted to be received within said receiver, said mouthpiece having one end where a player's lips meet the mouthpiece and an elongated shank at the opposite end for insertion through said opening into said receiver, a training device for use by a player positioned within said opening in said receiver, said training device comprising:
- a substantially planar shield having an upper side and an underside and an aperture formed in said shield extending between said upper side and said underside;
- at least two elongate, flexible and resilient prongs extending generally perpendicularly from the periphery of said aperture along the underside of said shield, said prongs having a length not exceeding the length of said mouthpiece shank;
- the underside of said shield defining with said one end of said receiver a gap, the shank of said mouthpiece passing through said aperture in said shield into said receiver for concentric positioning within said receiver with the prongs of said training device spacing said shank from the inner walls of said receiver.

15. A training device, as claimed in claim 14, wherein said aperture has a diameter which is not less than the diameter of said receiver opening.

16. A training device, as claimed in claim 14, wherein said prongs are circumferentially equally spaced apart about the periphery of said aperture.

17. A training device, as claimed in claim 14, wherein said shield and prongs are unitary and formed of molded plastic.

18. A training device, as claimed in claim 14, wherein said shield is generally disk shaped.

19. A training device, as claimed in claim 14, wherein said aperture is formed in the center of said shield.

20. A training device, as claimed in claim 14, wherein the peripheral edge of said shield upper side is convex.

21. A training device, as claimed in claim 14, wherein two prongs extend from said shield.

22. A training device, as claimed in claim 14, wherein said gap defines a space of about 1/16" to 3/16".

23. A training device, as claimed in claim 14, further including means on said prongs for limiting the insertion of said device into said receiver.

24. A training device, as claimed in claim 23, wherein said means comprises a protrusion on the radially outer surface, relative to said aperture, of said prongs at a predetermined distance spaced from the underside of said shield.

25. A training device, as claimed in claim 14, wherein said shield is generally disk shaped, said aperture has a larger diameter than said receiver opening and is formed in the center of said disk and two prongs are circumferentially equally spaced about the periphery of said aperture.

26. In combination with a brass musical instrument having an instrument body, a tubular mouthpiece receiver having an opening in one end thereof and a mouthpiece adapted to be received within said receiver, said mouthpiece having one end where a player's lips meet the mouthpiece and an elongated shank at the opposite end for insertion through said opening into said receiver, a training device for use by a player positioned adjacent said opening in said receiver, said training device, comprising:
- a substantially planar shield having an upper side and an underside and an aperture formed in said shield extending between said upper side and said underside;
- at least two elongate, flexible and resilient prongs extending generally perpendicularly from the underside of said shield at equal radial distances beyond the periphery of said aperture such that said prongs are spaced apart sufficiently that the distance between said prongs is slightly greater than the outer diameter of said receiver, said prongs having a length not exceeding the length of said mouthpiece shank, the ends of said prongs remote from said shield being interconnected by a circumferential band surrounding at least a portion of said receiver, said band including means for tightening said band about the periphery of said receiver;
- the underside of said shield being positioned opposite said one end of said receiver with its prongs extending along the outer periphery of said receiver, whereby the position of said training device relative to said receiver can be adjusted and said device releasably fixed in position for defining a gap between the underside of said shield and said one end of said receiver, with said mouthpiece shank inserted through said aperture for concentric positioning within said receiver.

* * * * *